United States Patent
Lin et al.

(10) Patent No.: US 8,208,552 B2
(45) Date of Patent: Jun. 26, 2012

(54) METHOD, VIDEO ENCODER, AND INTEGRATED CIRCUIT FOR DETECTING NON-RIGID BODY MOTION

(75) Inventors: Siou-Shen Lin, Taipei County (TW); Te-Hao Chang, Taipei (TW); Chin-Chuan Liang, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 1189 days.

(21) Appl. No.: 12/019,888

(22) Filed: Jan. 25, 2008

(65) Prior Publication Data
US 2009/0190038 A1    Jul. 30, 2009

(51) Int. Cl.
*H04N 7/12* (2006.01)
(52) U.S. Cl. .............. 375/240.16; 375/240.12
(58) Field of Classification Search .................. None
See application file for complete search history.

(56) References Cited

U.S. PATENT DOCUMENTS

| | | | | |
|---|---|---|---|---|
| 6,590,999 B1 * | 7/2003 | Comaniciu et al. | ......... | 382/103 |
| 6,606,412 B1 * | 8/2003 | Echigo et al. | ......... | 382/224 |
| 7,120,276 B1 * | 10/2006 | Brady et al. | ......... | 382/107 |
| 7,142,600 B1 * | 11/2006 | Schonfeld et al. | ...... | 375/240.16 |
| 2002/0031181 A1 * | 3/2002 | Doux | ...... | 375/240.16 |
| 2004/0091047 A1 * | 5/2004 | Paniconi et al. | ...... | 375/240.16 |
| 2004/0189863 A1 * | 9/2004 | Gu et al. | ...... | 348/416.1 |
| 2005/0135481 A1 * | 6/2005 | Sung | ...... | 375/240.16 |
| 2007/0297510 A1 * | 12/2007 | Herpel et al. | ...... | 375/240.15 |
| 2011/0051808 A1 * | 3/2011 | Quast et al. | ...... | 375/240.08 |

* cited by examiner

*Primary Examiner* — Donald Mills
(74) *Attorney, Agent, or Firm* — Thomas|Kayden

(57) ABSTRACT

A method for detecting a non-rigid-body in video coding and an integrated circuited for the same are disclosed. The integrated circuit capable of detecting non-rigid-body comprises a best matched block, a correlation unit, and a non-rigid-body detection unit. The best matched block unit receives a current block in a current video frame and block searching a reference video frame to determine an initial motion vector for a best matched block in the reference video frame. The correlation unit, coupled to the best matched block unit, receives the best matched block, and computes a correlation between a corresponding block and the best matched block. The non-rigid-body detection unit, coupled to the correlation unit, determines whether the current block contains non-rigid-body according to the correlation.

26 Claims, 3 Drawing Sheets

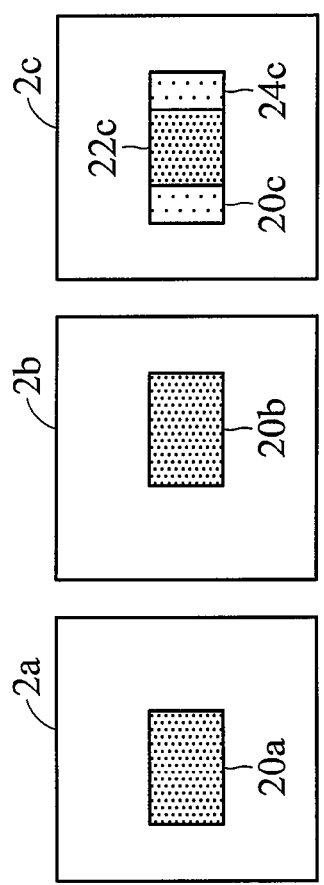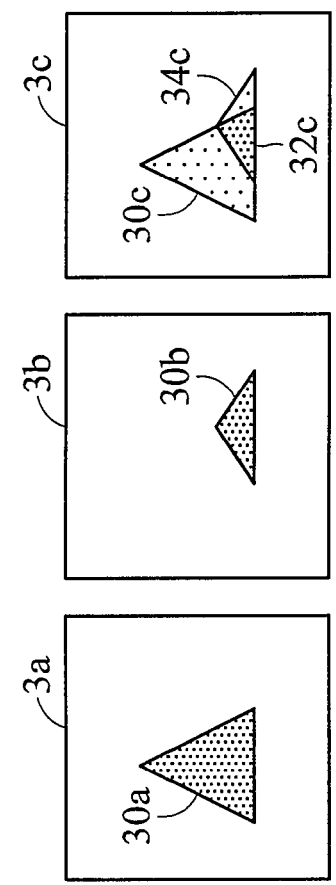

US 8,208,552 B2

METHOD, VIDEO ENCODER, AND INTEGRATED CIRCUIT FOR DETECTING NON-RIGID BODY MOTION

BACKGROUND OF THE INVENTION

1. Field of the Invention

The invention relates in general to video processing, and in particular, to a method, a video encoder, and an integrated circuit for detecting non-rigid body motion.

2. Description of the Related Art

Block-based video coding standards such as MPEG 1/2/4 and H.26x achieve data compression by reducing temporal redundancies between video frames and spatial redundancies within a video frame.

Each video frame comprises an array of pixels. A macroblock (MB) is typically composed of 16×16 pixels, and a coding unit can be a complete MB or sub-partitioned blocks such as 16×8, 8×16, 8×8, 8×4, 4×8, or 4×4. It is common to estimate movement of an image between frames on a block basis, referred to as motion estimation. Motion estimation typically comprises comparing a macroblock in the current frame to a number of macroblocks from reference frames for similarity. The displacement between the macroblock in the current video frame and the most similar macroblock in the reference frames is represented by a motion vector (MV). The most similar macroblock in the reference video frame is referred to as the best matched block.

FIG. 1 depicts the process of motion estimation, where 1a is a current video frame and 1b is a previous (reference) video frame. Motion estimation involves searching object 10a of a current video frame 1a in a search window SW of a previous video frame 1b to find a best matched object 10b. The spatial displacement from object 10a to 10b is the motion vector.

Motion estimation is typically performed to determine the best matched block in the reference frame, i.e., the MB with smallest residue. However, in applications such as video tracking and frame rate conversion (FRC), it is more important to find "true motion" rather than the best matched block. For example, when applying motion estimation for a non-rigid-body such as flames or flags, the object under estimation has little or no correlation to anywhere in the reference video frame, thus the video encoder cannot produce accurate estimation for the true motion of the object. Further, the inaccurately estimated MV for the non-rigid-body causes interpolation error in frame rate conversion applications. Thus, a need exists for a method and an integrated circuit to produce accurate motion estimation for a non-rigid body motion.

BRIEF SUMMARY OF THE INVENTION

A detailed description is given in the following embodiments with reference to the accompanying drawings.

A method for method for detecting non-rigid-body in video processing, comprising: receiving a current block in a current video frame and performs block matching in a reference video frame to determine an initial motion vector for a best matched block in the reference video frame, computing a correlation between a corresponding block and the best matched block, and determining whether the current block contains non-rigid-body according to the correlation.

According to another embodiment of the invention, an integrated circuit capable of detecting non-rigid-body is disclosed, comprising a best matched block, a correlation unit, and a non-rigid-body detection unit. The best matched block unit receives a current block in a current video frame and block searching a reference video frame to determine an initial motion vector for a best matched block in the reference video frame. The correlation unit, coupled to the best matched block unit, receives the best matched block, and computes a correlation between a corresponding block and the best matched block. The non-rigid-body detection unit, coupled to the correlation unit, determines whether the current block contains non-rigid-body according to the correlation.

According to another embodiment of the invention, an apparatus for video processing is provided, comprising a best matched block determination unit, a correlation unit, and a non-rigid-body detection unit. The best matched block determination unit receives a current block in a current video frame and performs block searching in a reference video frame to determine an initial motion vector for a best matched block in the reference video frame. The correlation unit, coupled to the best matched block determination unit, receives the best matched block, and computing a correlation between a corresponding block and the best matched block. The non-rigid-body detection unit, coupled to the difference unit, determines whether the current block contains non-rigid-body according to the correlation.

BRIEF DESCRIPTION OF THE DRAWINGS

The invention can be more fully understood by reading the subsequent detailed description and examples with references made to the accompanying drawings, wherein:

FIG. 2 illustrates a motion estimation method applied to rigid-body motion according to an embodiment of the invention.

FIG. 3 illustrates a motion estimation method applied to non-rigid-body motion according to an embodiment of the invention.

DETAILED DESCRIPTION OF THE INVENTION

Figure 1:
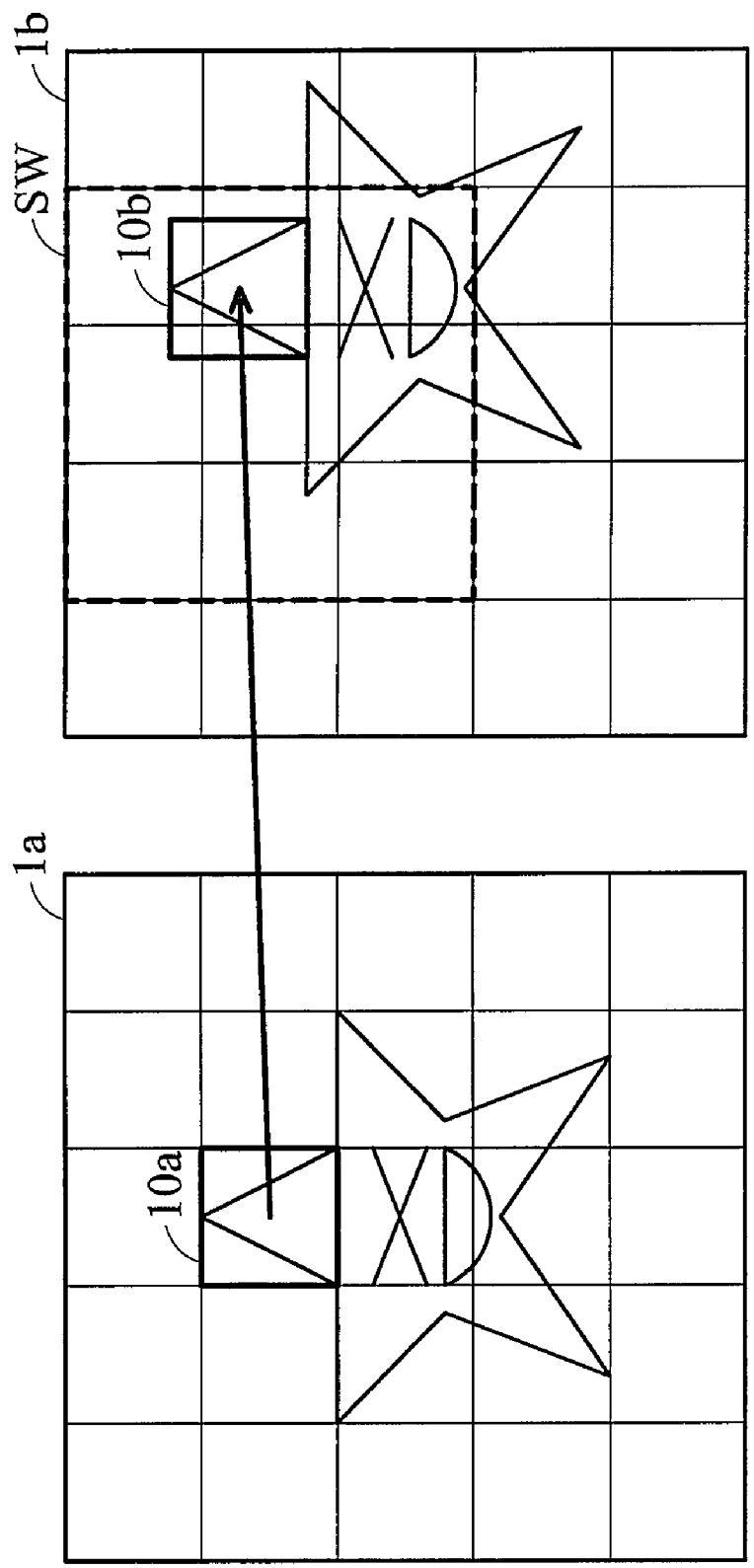
FIG. 1 illustrates a conventional motion estimation process.

The following description is of the best-contemplated mode of carrying out the invention. This description is made for the purpose of illustrating the general principles of the invention and should not be taken in a limiting sense. The scope of the invention is best determined by reference to the appended claims.

FIG. 2 shows an embodiment of a motion estimation method applied on rigid-body motion, where 2a is a reference frame with block 20a, 2b is a current frame with block 20b, and 2c shows a block average of blocks 20a and 20b.

A corresponding block average is obtained by averaging each pixel covered by a block in the current frame 2b and its corresponding block in the reference frame 2a. The corresponding block of block A in an embodiment means a block in another frame having the same location as block A, which is also called the co-located block. In some other embodiments, the corresponding block of block A is a block in another frame located in a position with a predetermined shift to A's co-located position. The direction and amplitude of the predetermined shift is typically set according to motion information such as motion vectors. For a rigid-body motion, a best matched block has a high degree of correspondence to the corresponding block, thus a difference between the best matched block and the corresponding block should be small. Non-rigid body detection involves calculating a correlation between the best matched block and the corresponding block. In some embodiments, a difference between the best matched block and a corresponding block average is calculated to determine the existing of non-rigid body, and please refer to the following examples for further details.

FIG. 3 shows a motion estimation method applied to non-rigid-body motion according to an embodiment of the invention, where 3a is a reference frame with block 30a, 3b is a current frame with block 30b, and 3c contains a corresponding block average of the reference frame 3a and current frame 3b.

The corresponding block average is obtained by averaging each pixel covered by a block in the current frame and its corresponding block in the reference frame. For a non-rigid-body motion, a best matched block has a low degree of correspondence to the corresponding block, thus a difference between the best matched block and the corresponding block average should be large.

Figure 4:
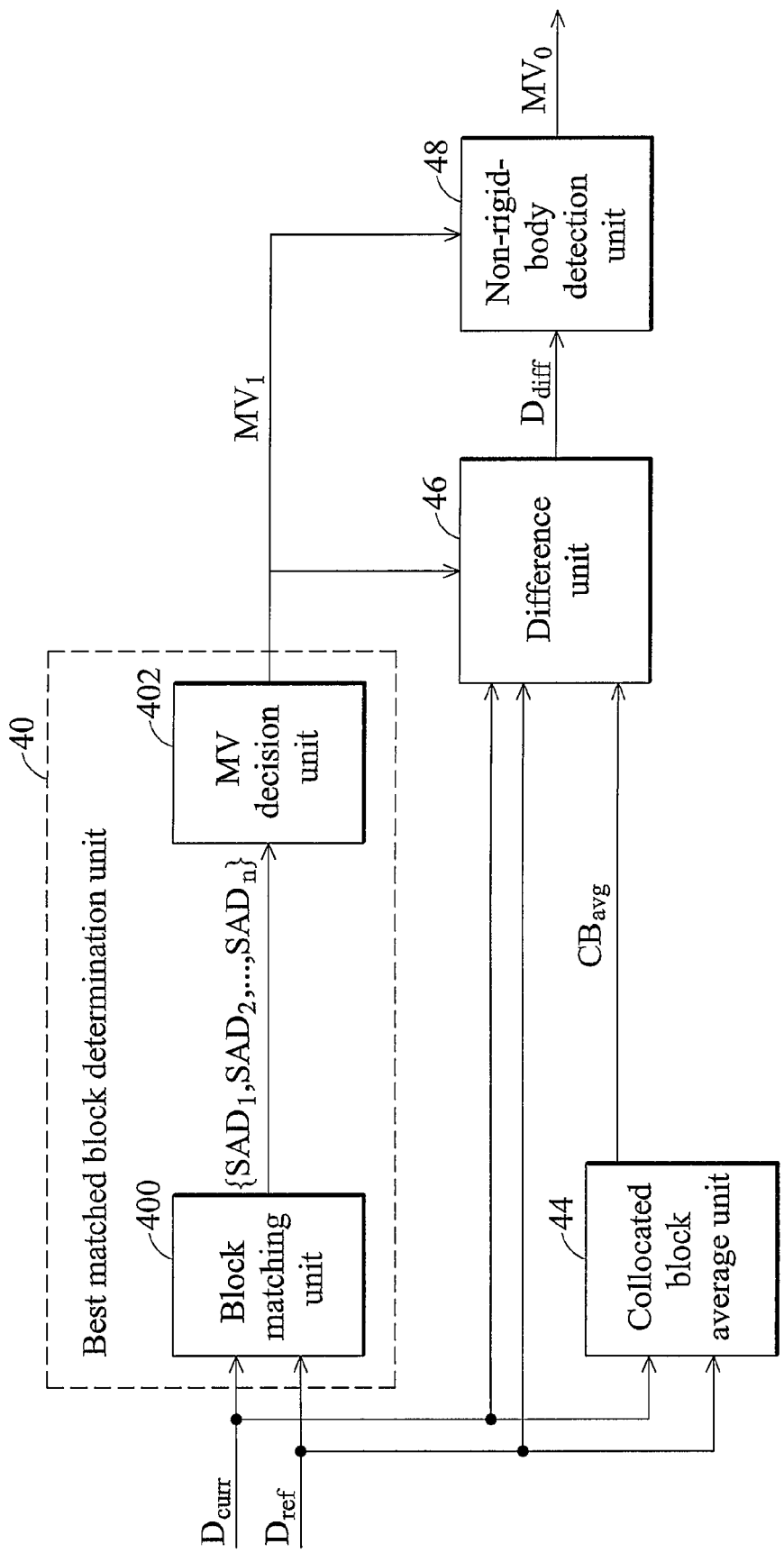
FIG. 4 is a block diagram of an exemplary circuit for detecting non-rigid-body in video coding.

FIG. 4 is a block diagram of an exemplary circuit for detecting non-rigid-body in video coding, comprising best matched block determination unit 40, corresponding block average unit 44, difference unit 46, and non-rigid-body detection unit 48. Best matched block determination unit 40 and corresponding block average unit 44 are coupled to difference unit 46, and subsequently to non-rigid-body detection unit 48.

Best matched block determination unit 40 receives current block $D_{curr}$ in a current video frame and search window data $D_{ref}$ in reference video frame to perform motion estimation and determine initial motion vector MVi for a best matched block in the reference video frame. Current block $D_{curr}$ of this embodiment is a macroblock with block size M×N. Best matched block determination unit 40 comprises block matching unit 400 and MV decision unit 402 coupled thereto. Block matching unit 400 receives current block $D_{curr}$ and performs block matching in search window $D_{ref}$ to calculate correlation indexes of a plurality of MV candidates (e.g. sum of absolute difference $\{SAD_1, SAD_2, \ldots, SAD_n\}$) based on a predetermined estimation algorithm such as full search, 3-step search, or 3-D recursive search. MV decision unit 402 obtains MV candidates and their correlation indexes $\{SAD_1, SAD_2, \ldots, SAD_n\}$ to select a MV candidate with maximum correlation or minimum difference as the initial motion vector MVi. Initial motion vector MVi represents the displacement error for determination of the best matched block in the reference video frame.

Corresponding block average unit 44 receives the reference video frame and the current video frame to determine a corresponding block average. A corresponding block may be a co-located block, global MV position block, or median MV position block of neighboring blocks in the reference video frame. Using co-located blocks as corresponding blocks in corresponding block average unit 44 is a fair approach when the movement in the video frame is relatively slow. The global MV position block is a block derived by a global motion of an area/frame, and it is utilized when most objects in the area/frame are move in the same direction with approximately the same speed. The median MV position block is derived by a local motion of neighboring blocks, which is suitable for cases when most or all objects close to the current block are moving toward the same direction with the same speed.

The global motion is obtained by taking the most frequently occurred MV in an area or a frame as the global MV. For examples, the MVs for all blocks in an area or a frame may be plotted in a histogram so that the most frequently occurred MV can be identified as the global MV for the global MV position block.

In the case of using a co-located block as the corresponding block, the corresponding block average may be computed by taking an average of each pixel covered by current block $D_{curr}$ and the co-located block of reference video frame. The following provides an exemplary corresponding block average algorithm to be incorporated into the corresponding block average unit 44:

```
For n=0 to N-1
    For m=0 to M-1
        ZB_avg[m][n] = ½ (C(m,n)+P(m,n))
    End
End
```

Where C(m,n) and P(m,n) are a pixel at coordinate (m,n) of current block and corresponding block respectively, each block comprises M×N pixels; and $ZB_{avg}[m][n]$ is the corresponding block average for the current block.

In other embodiments, the corresponding block may be a global MV position block, or a median MV position block of neighboring blocks, and the corresponding block average is computed by averaging pixels in a current block and a block in the reference frame that is shifted from the co-located position by a global MV or a median MV of the neighboring blocks. For example, the global MV is (p,q), so that corresponding block average unit 44 utilizes P(m+p,n+q) for working out the block average.

The global MV position block is estimated by taking several motion vectors from a number of locations in the reference video frame or in a predefined area of the reference video frame, for example, 9 locations, the motion vectors for the 9 locations are calculated and an average or median MV is identified as the global MV. The median MV of the neighboring blocks is determined by taking all neighboring MV of the corresponding block in the reference video frame and finding a median MV therefrom for the MV of the median MV position block.

Difference unit 46 receives initial motion vector MVi and the current block to generate a best matched block, and computes difference $D_{diff}$ between corresponding block average $CB_{avg}$ and the best matched block. An exemplary algorithm is shown in the following:

```
For n=0 to N-1
    For m=0 to M-1
        D_diff = D_diff + |ZB_avg[m][n]-C(m,n)|+ |ZB_avg[m][n]+P(m+i,n+j)|
    End
End
```

Where C(m,n) and P(m,n) are current and reference video frames, each comprises M×N pixels;

$ZB_{avg}[m][n]$ is the corresponding block average;

(i,j) is an initial motion vector Vi pointed to the best matched block; and difference $D_{diff}$ is the difference between the corresponding block average and best matched block.

Difference $D_{diff}$ is obtained by adding initial motion vector MVi (i,j) to reference frame P(m,n) and then subtracting best matched block P(m+i, n+j) from corresponding block average $ZB_{avg}[m][n]$, representing the correlation between best matched block P(m+i,n+j) and corresponding block average $ZB_{avg}[m][n]$. The higher correlation therebetween, the smaller the value of difference $D_{diff}$. For rigid-body motion, the best matched block is closely correlated to the corresponding block (either a co-located block or a shifted block), thus small difference $D_{diff}$ is expected. Conversely, for nonrigid-body motion, the best matched block has little or no correlation to the correlated block, thus large difference $D_{diff}$ is expected.

Non-rigid-body detection unit 48 determines whether current block $D_{curr}$ has non-rigid-body according to difference $D_{diff}$, for example, it compares difference $D_{diff}$ with a difference threshold, and determines current block $D_{curr}$ contains non-rigid-body when difference $D_{diff}$ exceeds the difference threshold, and determines current block $D_{curr}$ contains only rigid-body when the difference $D_{diff}$ is less than or equal to the difference threshold. Non-rigid-body detection unit 48 outputs initial motion vector MVi as output motion vector MVo upon detecting current block $D_{curr}$ only contains rigid-body, or outputs an MV of the corresponding block or an average MV (e.g. median) of the neighboring blocks for current block $D_{curr}$ upon determination of a non-rigid-body.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting non-rigid-body in video processing, comprising:
    receiving a current block in a current video frame and performs block matching in a reference video frame to determine an initial motion vector for a best matched block in the reference video frame;
    computing a correlation between a corresponding block and the best matched block; and
    determining whether the current block contains non-rigid-body according to the correlation;
    wherein the corresponding block is derived from a co-located block in the reference video frame corresponding to the current block.

2. The method for claim 1, wherein determination of non-rigid-body comprises:
    comparing the correlation with a threshold; and
    determining the current block containing non-rigid-body when the correlation exceeds the difference threshold.

3. The method for claim 1, further comprising:
    averaging the corresponding block in the reference video frame and the current block to obtain a corresponding block average; and
    wherein the correlation is computed using the corresponding block average.

4. The method for claim 3, wherein the computation step comprises computing a sum of pixel differences between pixels in the corresponding block average and the best matched block.

5. The method for claim 1, further comprising outputting an MV pointing to the corresponding block for the current block upon determination of the non-rigid-body.

6. The method for claim 1, further comprising outputting an average MV of the neighboring blocks for the current block upon determination of the non-rigid-body.

7. The method for claim 6, wherein the average MV of the neighboring blocks is the median MV, averaged MV, global MV, or a combination thereof.

8. An integrated circuit capable of detecting non-rigid-body, comprising:
    a best matched block determination circuit, receiving a current block in a current video frame and block searching a reference video frame to determine an initial motion vector for a best matched block in the reference video frame;
    a correlation unit, coupled to the best matched block determination circuit, receiving the best matched block, and computing a correlation between a corresponding block and the best matched block; and
    a non-rigid-body detection unit, coupled to the correlation circuit, determining whether the current block contains non-rigid-body according to the correlation;
    wherein the corresponding block is derived from a co-located block in the reference video frame corresponding to the current block.

9. The integrated circuit of claim 8, wherein the non-rigid-body detection circuit compares the correlation with a threshold and determines whether the current block contains non-rigid-body when the correlation exceeds the threshold.

10. The integrated circuit of claim 8, further comprising a corresponding block average circuit, averaging the corresponding block in the previous reference video frame and the current block to obtain a corresponding block average; and the correlation is calculated using the corresponding block average.

11. The integrated circuit of claim 10, wherein the correlation circuit computes a sum of pixel differences between pixels in the corresponding block average and the best matched block.

12. The integrated circuit of claim 8, wherein the non-rigid-body detection circuit further outputs an MV of the corresponding block for the current block upon determination of the non-rigid-body.

13. The integrated circuit of claim 8, wherein the non-rigid-body detection circuit further outputs an average MV of the neighboring blocks for the current block upon determination of the non-rigid-body.

14. The integrated circuit for claim 13, wherein the average MV of the neighboring blocks is the median MV, averaged MV, global MV, or a combination thereof.

15. An apparatus for video processing, comprising:
    a best matched block determination circuit, receiving a current block in a current video frame and performing block searching in a reference video frame to determine an initial motion vector for a best matched block in the reference video frame;
    a correlation circuit, coupled to the best matched block determination unit, receiving the best matched block, and computing a correlation between a corresponding block and the best matched block; and
    a non-rigid-body detection circuit, coupled to a difference unit, determining whether the current block contains non-rigid-body according to the correlation
    wherein the corresponding block is derived from a co-located block in the reference video frame corresponding to the current block.

16. The apparatus of claim 15, wherein the non-rigid-body detection circuit compares the correlation with a threshold and determines whether the current block contains non-rigid-body when the correlation exceeds the threshold.

17. The apparatus of claim 15, further comprising a corresponding block average circuit, averaging the corresponding block in the previous reference video frame and the current block to obtain a corresponding block average; wherein the correlation unit calculates the correlation based on the corresponding block average.

18. The apparatus of claim 17, wherein the correlation circuit computes a sum of pixel differences between pixels in the corresponding block average and the best matched block.

19. The apparatus of claim 15, wherein the non-rigid-body detection circuit further outputs an MV of the corresponding block for the current block upon determination of the non-rigid-body.

20. The apparatus of claim 15, wherein the non-rigid-body detection circuit further outputs an average MV of the neighboring blocks for the current block upon determination of the non-rigid-body.

21. The method of claim 1, wherein the corresponding block comprises the co-located block shifted by a global MV.

22. The method of claim 1, wherein the corresponding block comprises the co-located block shifted by a median MV of neighboring blocks thereof.

23. The integrated circuit of claim 8, wherein the corresponding block comprises the co-located block shifted by a global MV.

24. The integrated circuit of claim 8, wherein the corresponding block comprises the co-located block shifted by a median MV of neighboring blocks thereof.

25. The apparatus of claim 15, wherein the corresponding block comprises the co-located block shifted by a global MV.

26. The apparatus of claim 15, wherein the corresponding block comprises the co-located block shifted by a median MV of neighboring blocks thereof.

* * * * *